US011889278B1

(12) United States Patent
Wu et al.

(10) Patent No.: US 11,889,278 B1
(45) Date of Patent: Jan. 30, 2024

(54) VEHICLE SENSOR MODULES WITH EXTERNAL AUDIO RECEIVERS

(71) Applicant: Waymo LLC, Mountain View, CA (US)

(72) Inventors: Cheng-Han Wu, Sunnyvale, CA (US); Choon Ping Chng, Los Altos, CA (US); Jun Hou, Shanghai (CN); Miklos Szentkiralyi, San Bruno, CA (US); Rutvik Acharya, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 17/645,588

(22) Filed: Dec. 22, 2021

(51) Int. Cl.
*H04R 3/00* (2006.01)
*H04R 1/02* (2006.01)
*B60W 50/14* (2020.01)

(52) U.S. Cl.
CPC ............. *H04R 3/005* (2013.01); *H04R 1/02* (2013.01); *B60W 50/14* (2013.01); *H04R 2499/13* (2013.01)

(58) Field of Classification Search
CPC ...... H04R 3/005; H04R 1/02; H04R 2499/13; B60W 50/14
USPC ............................ 381/56, 58, 86, 122, 302
See application file for complete search history.

(56) References Cited

U.S. PATENT DOCUMENTS

| | | |
|---|---|---|
| 9,062,983 B2 | 6/2015 | Zych |
| 9,426,553 B2 | 8/2016 | Iwai |
| 10,319,228 B2 | 6/2019 | Silver |
| 10,674,243 B2 | 6/2020 | Kargus |
| 2017/0311092 A1* | 10/2017 | Secall ................. H04R 25/552 |
| 2018/0259976 A1* | 9/2018 | Williams ........... G01C 21/3664 |
| 2019/0387297 A1* | 12/2019 | Shahmurad ............ H04R 1/406 |
| 2020/0031337 A1 | 1/2020 | Soltanian |
| 2020/0064856 A1* | 2/2020 | Silver ................. B60R 11/0247 |
| 2020/0118418 A1 | 4/2020 | Benjamin |
| 2020/0348687 A1 | 11/2020 | Paudel |

(Continued)

FOREIGN PATENT DOCUMENTS

| | | |
|---|---|---|
| DE | 102019211580 A1 | 2/2021 |
| WO | 2019219718 A1 | 11/2019 |
| WO | 2020127408 A1 | 6/2020 |

OTHER PUBLICATIONS

"RoboSense Teams Up With Webasto on Smart Roof Module with Integrated MEMS LiDAR", Business Wire, https://www.buisnesswire.com/news/home/20210423005 (2021).

*Primary Examiner* — William A Jerez Lora
(74) *Attorney, Agent, or Firm* — McDonnell Boehnen Hulbert & Berghoff LLP

(57) ABSTRACT

Example embodiments relate to vehicle sensor modules with external audio receivers. An example sensor module may include sensors and can be coupled to a vehicle's roof with a first microphone positioned proximate to the front of the sensor module. The sensor module can also include a second microphone extending into a first side of the sensor module such that the second microphone is configured to detect audio originating from an environment located relative to a first side of the vehicle and a third microphone extending into a second side of the sensor module such that the third microphone is configured to detect audio originating from the environment located relative to a second side of the vehicle, wherein the second side is opposite of the first side.

20 Claims, 12 Drawing Sheets

(56) References Cited

U.S. PATENT DOCUMENTS

| | | |
|---|---|---|
| 2020/0398832 A1 | 12/2020 | Tzirkel-Hancock |
| 2021/0109187 A1* | 4/2021 | Watt .................. H04R 3/005 |
| 2021/0318444 A1 | 10/2021 | Li |
| 2021/0331651 A1* | 10/2021 | Baldovino ............ G01S 7/4813 |
| 2021/0354636 A1* | 11/2021 | Higashimachi .......... H04N 7/18 |

* cited by examiner

US 11,889,278 B1

VEHICLE SENSOR MODULES WITH EXTERNAL AUDIO RECEIVERS

BACKGROUND

Advancements in computing, sensors, and other technologies have enabled vehicles to safely navigate between locations autonomously, i.e., without requiring input from a human driver. By processing sensor measurements of the surrounding environment in near real-time, an autonomous vehicle can safely transport passengers or objects (e.g., cargo) between locations while avoiding obstacles, obeying traffic requirements, and performing other actions that are typically conducted by the driver. Shifting both decision-making and control of the vehicle over to vehicle systems can allow the vehicle's passengers to devote their attention to tasks other than driving.

SUMMARY

Example embodiments described herein relate to vehicle sensor modules with external audio receivers. By strategically arranging recessed external audio receivers on a vehicle sensor module, vehicle systems can use audio measurements of the surrounding environment captured by the receivers to localize sirens and other noises relative to the vehicle during navigation. This strategic arrangement can enable the audio receivers to clearly convert outside audio into electrical signals while undesired noise interference from wind and vehicle component vibrations are minimized.

In one aspect, an example system is provided. The system includes a vehicle and a sensor module coupled to a roof of the vehicle such that a gap is formed between portions of a bottom surface of the sensor module and the roof. The sensor module includes one or more sensors. The system also includes a set of microphones coupled to the sensor module. The set of microphones includes: (i) a first microphone positioned proximate a front of the sensor module, where the first microphone extends into a given portion of the bottom surface of the sensor module proximate the gap, (ii) a second microphone extending into a first side of the sensor module such that the second microphone is configured to detect audio originating from an environment extending from a first side of the vehicle, and (iii) a third microphone extending into a second side of the sensor module such that the third microphone is configured to detect audio originating from the environment extending from a second side of the vehicle. The second side is opposite of the first side.

In another aspect, an example sensor module is provided. The sensor module includes one or more sensors and a set of microphones that include a first microphone positioned proximate a front of the sensor module. The first microphone extends into a given portion of a bottom surface of the sensor module. The set of microphones also includes a second microphone extending into a first side of the sensor module such that the second microphone is configured to detect audio originating from an environment extending from the first side of the sensor module, and a third microphone extending into a second side of the sensor module such that the third microphone is configured to detect audio originating from the environment extending from the second side of the sensor module, wherein the second side is opposite of the first side.

In yet another aspect, an example method is provided. The method involves receiving, at a computing device, audio data from a set of microphones located on a sensor module coupled to a roof of a vehicle. The audio data represents one or more sounds originating from an environment of the vehicle. The set of microphones comprises a first microphone positioned proximate a front of the sensor module, where the first microphone extends into a given portion of the bottom surface of the sensor module proximate the gap, a second microphone extending into a first side of the sensor module such that the second microphone is configured to detect audio originating from the environment extending from a first side of the vehicle, and a third microphone extending into a second side of the sensor module such that the third microphone is configured to detect audio originating from the environment extending from a second side of the vehicle, wherein the second side is opposite of the first side. The method also involves determining a direction of a particular sound relative to the vehicle based on the audio data, and controlling the vehicle based on determining the direction of the particular sound relative to the vehicle.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
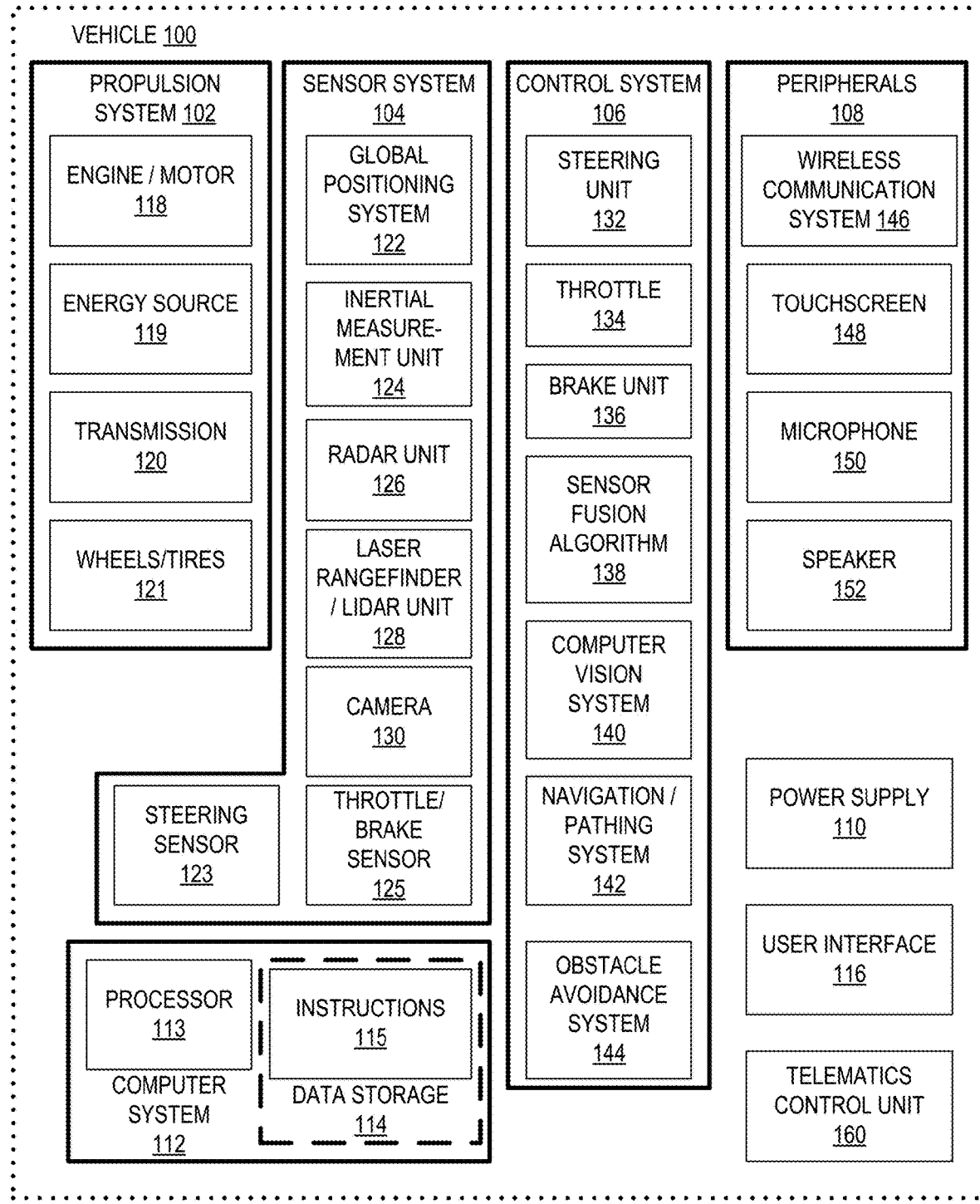
FIG. 1 is a functional block diagram illustrating a vehicle, according to example implementations.
Figure 2A:
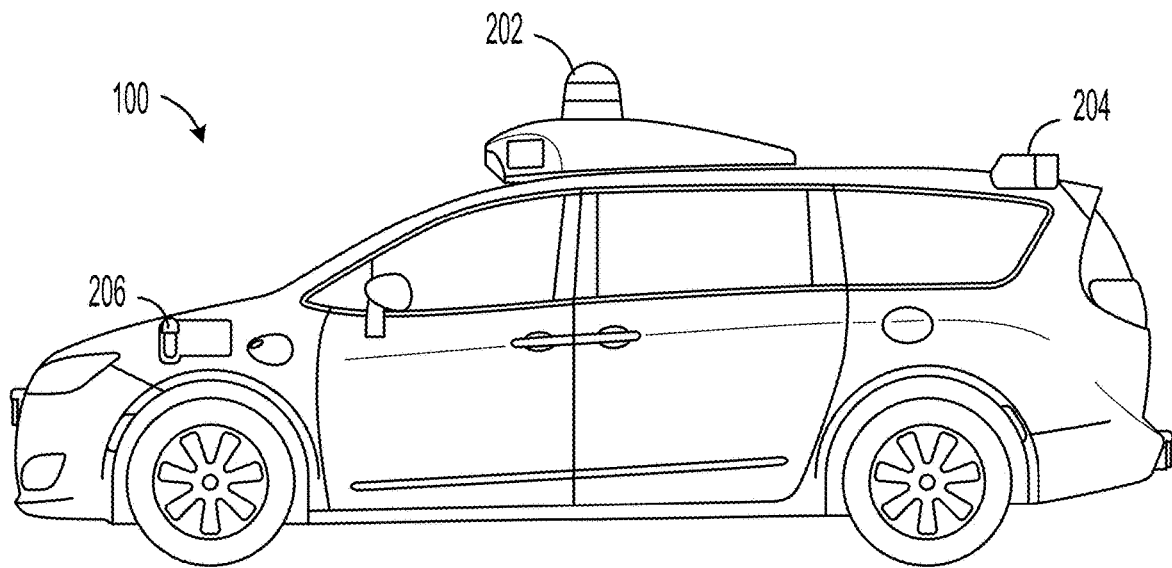
FIG. 2A illustrates a side view of a vehicle, according to one or more example embodiments.
Figure 2B:
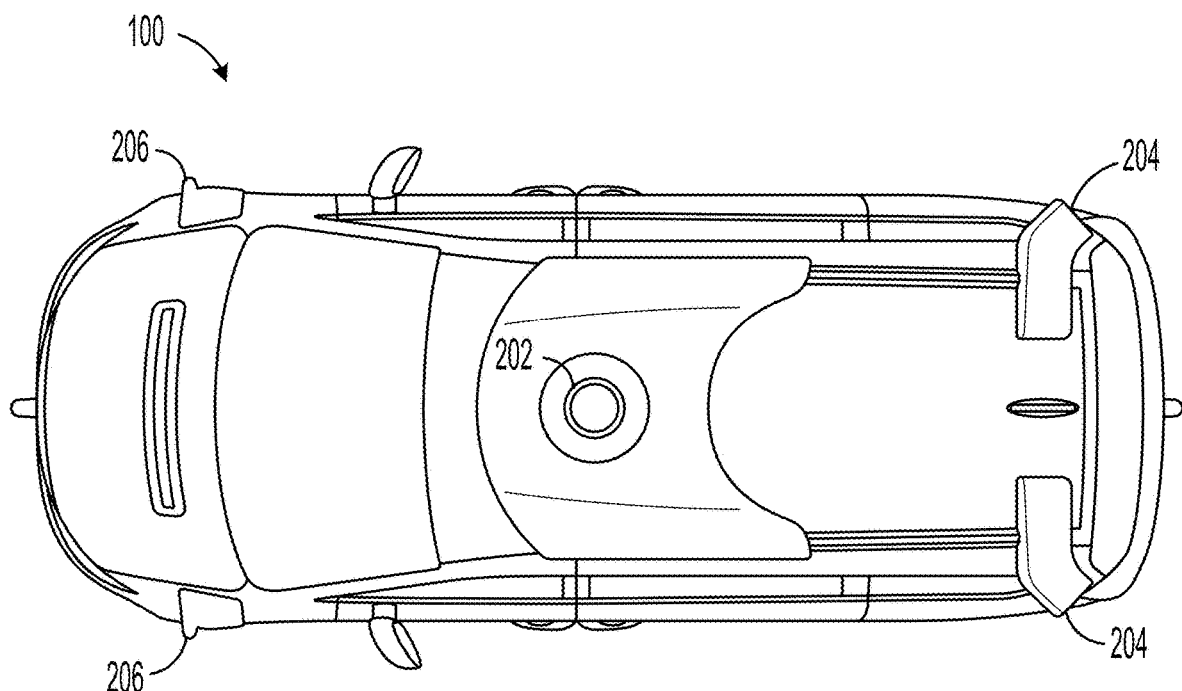
FIG. 2B illustrates a top view of a vehicle, according to one or more example embodiments.
Figure 2C:
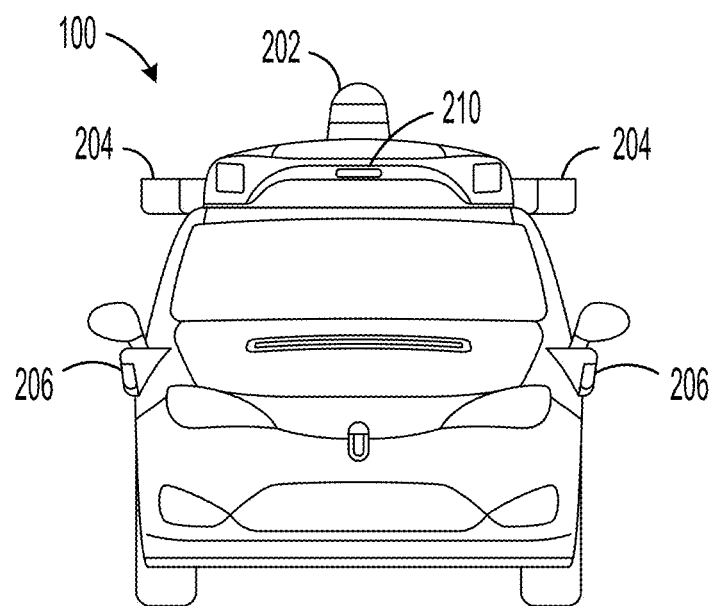
FIG. 2C illustrates a front view of a vehicle, according to one or more example embodiments.
Figure 2D:
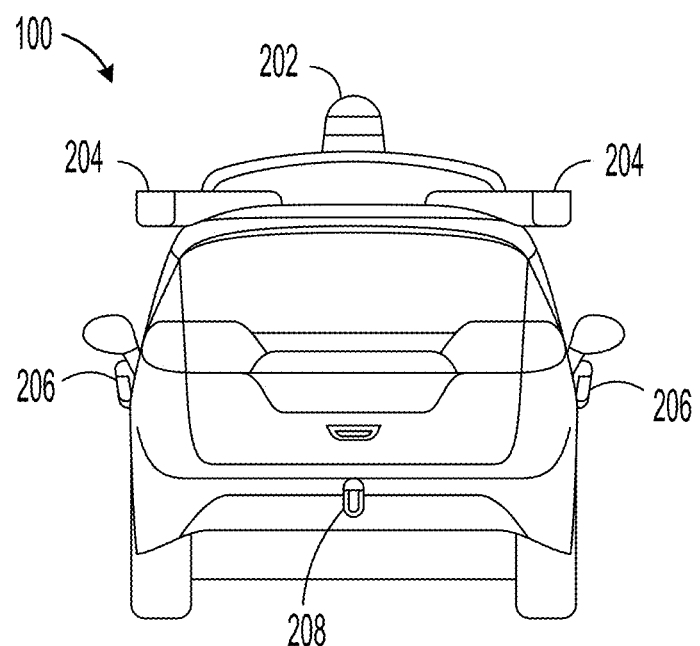
FIG. 2D illustrates a back view of a vehicle, according to one or more example embodiments.
Figure 2E:
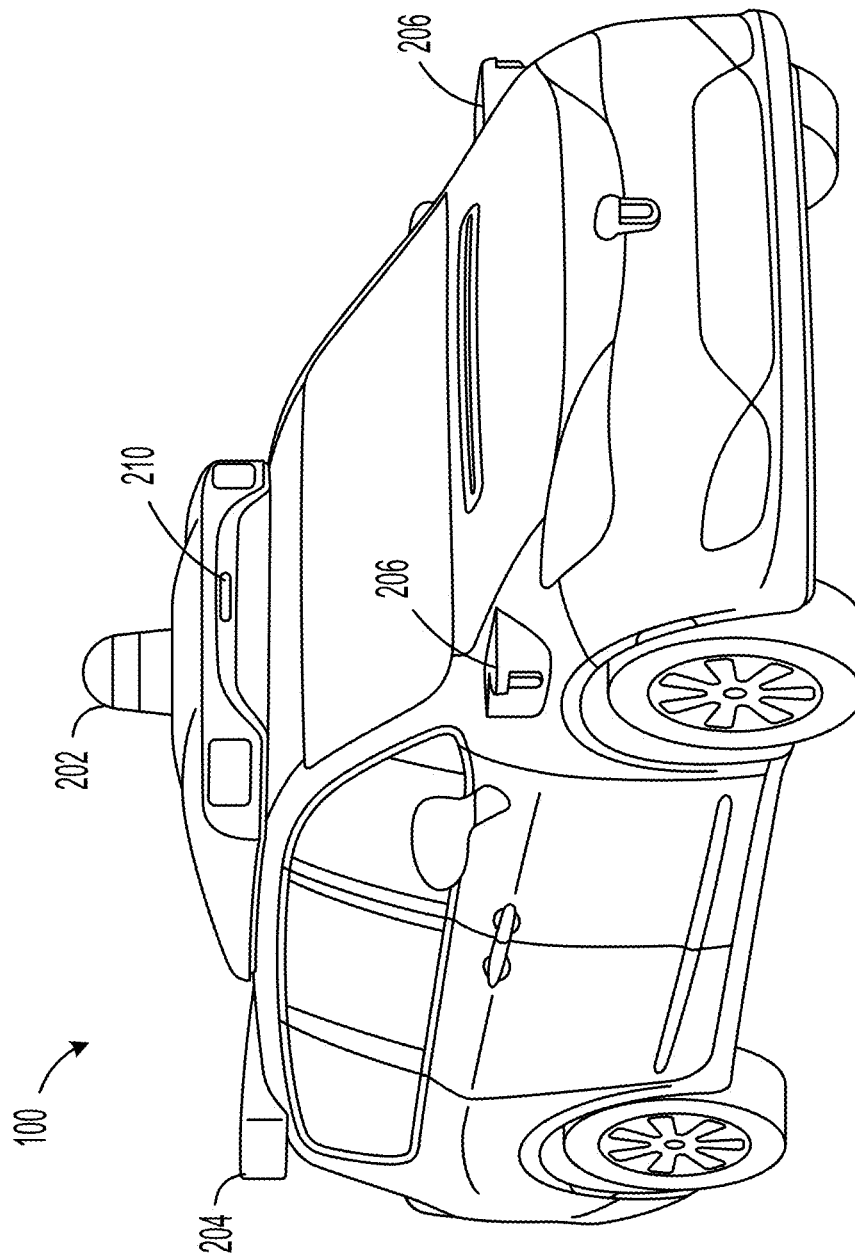
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Some vehicles can use sensors to measure and navigate according to elements in the surrounding environment, such as road barriers, traffic signals and signs, pedestrians, and other vehicles, etc. In order to navigate in an autonomous or semi-autonomous mode, vehicle systems may perform a variety of tasks that are typically handled by a human driver. For instance, vehicle systems determine the locations of nearby objects and predict future states for these objects as part of determining a control strategy for the vehicle that also factors traffic signals and road boundaries.

Although many navigation maneuvers are performed based on spatial information representing locations of boundaries and objects in the surrounding information, audio measurements from the environment can also be utilized by vehicle systems to determine control strategy for the vehicle. For instance, microphones or other types of audio receivers can be positioned on the exterior of the vehicle to convert external sounds into electrical signals for use by the vehicle systems. The vehicle systems may use incoming audio information to identify various sounds in the surrounding environment, such as emergency vehicle sirens, vehicle horns, and audio alerts from traffic directors. As the vehicle navigates, however, wind and vehicle component vibrations may add undesired noise to audio measurements captured by the external audio receivers.

Example embodiments described herein relate to vehicle sensor modules that incorporate external audio receivers in arrangements that minimize the impact of wind, vibrations from vehicle components, and other sources of undesired noise during navigation. Some example vehicle sensor modules include multiple microphone modules that are strategically positioned on different locations of the sensor module to allow vehicle systems to extract additional information about the environment based on surrounding sounds. For instance, a computing device can use sound detections to identify which microphones are receiving a particular sound (e.g., an emergency siren) and compare the power levels of the detection of that sound to localize the origination of the sound relative to the vehicle. In some cases, vehicle systems can detect when an emergency vehicle is approaching and from which direction using audio information captured by the microphones before the camera system captures images of the emergency vehicle. As an example result, vehicle systems can perform a pull-over maneuver or another control strategy to clear the path for the emergency vehicle.

Example embodiments of sensor modules with external audio receivers can differ in configuration and may depend on the particular application of the sensor module. Some example sensor modules presented herein are designed to add sensors for passenger vehicles while other example sensor modules have configurations implemented for use on trucks and other larger vehicles. In addition, a human driver may use the external microphones to hear sounds occurring around the vehicle during navigation. For instance, vehicle systems may lower or temporarily suspend a vehicle's internal media system in response to detecting the presence of a nearby siren to enable the driver to clearly hear the siren and respond accordingly. The audio receivers on a sensor module can also be bidirectional in some examples. In particular, a driver or another passenger may speak through the audio system built into the sensor module for other drivers, and pedestrians, etc. to hear. The audio system may amplify and increase the volume of the sounds provided by the driver or passenger. Vehicle systems can also implement features that discard recordings obtained by the external microphones in some examples.

In some cases, a vehicle sensor module may be configured to be positioned on the roof of the vehicle. For instance, the vehicle sensor module may include one or multiple cameras, lidars, radars, and/or other types of sensors that operate according to a field of view positioned on top of the vehicle's roof. By incorporating one or multiple microphones or other types of audio receivers into the roof-mountable vehicle sensor module, vehicle systems can detect sounds in the surrounding environment without needing microphones installed on other external locations of the vehicle. In addition, the external placement of the microphone or microphones can allow for better detection of external sounds than microphones placed inside the vehicle. In other examples, a sensor module with external audio receivers can be configured to couple to other portions of the vehicle.

In some embodiments, multiple microphone modules are located at different positions on the vehicle sensor module. A microphone module, also referred to herein as a microphone, represents one or more audio receivers configured to convert sounds into electrical signals representing audio information that computing devices can analyze and use. For instance, a vehicle sensor module may include microphone modules arranged at different positions that orient each microphone to primarily detect audio that originates from a particular area of the environment relative to the vehicle. A computing device can use incoming audio measurements from the different microphones to localize particular sounds relative to the vehicle. In some cases, the computing device can also estimate the rate that a particular sound is traveling toward or away from the vehicle. Consecutive measurements of external sounds can provide information related to the rate of travel of a particular sound. For example, detections of a siren may increase in volume as an emergency vehicle approaches a vehicle equipped with the sensor module with external audio receivers and decrease in volume as the emergency vehicle navigates away from the vehicle.

By way of an example, a roof-mountable sensor module may include four microphones strategically arranged on different portions of the sensor module. When mounted on a vehicle, one microphone may be positioned relative to the front of the sensor module that extends closest to the front of the vehicle while another microphone can have a position on the rear of the sensor module that extends toward the back of the vehicle. This way, the microphones can clearly detect sounds that originate from areas behind and in front of the vehicle, respectively. The sensor module can also include microphones located on the sides of the module, which may enable clearer detection of sounds that originate from areas to the sides of the vehicle. Although microphones on the sensor module may detect sounds regardless of the location of the sounds in some instances, the orientations of the microphones on the sensor module can cause some of the microphones to better receive external sounds originating from particular areas relative to the vehicle. This can be due to the cavity, angle, and/or orientation of a microphone module on the sensor module as well as portions of the sensor module and vehicle partially impacting the reception of sound waves at each microphone module.

In some examples, the sensor module may be coupled to the vehicle's roof in a way that causes a gap (open space) to form between portions of the sensor module and the roof. This way, one or more microphones (e.g., a front microphone module) can have a location on the bottom surface of the sensor module relative to the gap, which enables sound waves to enter into the microphone module via the gap. By positioning the front microphone module and/or other microphone modules near the gap when the sensor module is installed on the vehicle, the microphones may detect audio with less of an impact caused by winds that result during forward navigation.

To further enhance reception of sounds from the external environment, one or more microphones can have a recessed position on a sensor module in some example embodiments. For instance, the recessed position can involve extending the position for a microphone into a cavity positioned on a surface of the sensor module. Further, a recessed position could include one or more microphones being subflushed within the sensor module. For instance, one or more microphones can be positioned slightly below the surface of the sensor module. The depth, angle, shape, and configuration of the cavity can have different parameters in some examples, which may depend on the location of the cavity on the sensor module and type of microphone used. For instance, the cavity can place the microphone module 5-15 millimeters into the external surface of the sensor module. Other depths may exist.

In some examples, the depth and configuration of a cavity used to position a microphone module (e.g., one or more audio receivers) can depend on the protecting layer materials integrated to protect the microphone module. The protecting layer materials can be designed to prevent water and debris from contacting and potentially damaging the audio receivers. As such, thicker protecting layer materials may require a deeper cavity for the microphone module. In addition, in some implementations, the distance and shape of the recess space can create unwanted resonance. To avoid unwanted resonance, the cavity can be designed via simulation and calculation tests, which may involve comparing audio detection levels and clearity under different testing conditions.

In some examples, the cavity used for a microphone positioned to better detect sounds originating from in front of the vehicle may differ from the cavity used for a microphone positioned to better detect sounds originating from behind the vehicle. Wind experienced during navigation, the vibration of vehicle components, position of fans used to cool vehicle sensors, and/or other factors may be analyzed to select locations for positioning microphones on the vehicle sensor module. As such, wind tunnel tests, simulations, and real-world driving tests may be used when building example vehicle sensor modules with external audio receivers described herein.

In some examples, a computing device may use microphones on a vehicle sensor module to record ambient noises in the environment of the operating vehicle. This aids the vehicle in identifying and localizing external objects, such as emergency vehicles, railroad crossings, honks from other vehicles, and/or passenger detections. As an example result, vehicle systems can perform appropriate actions during navigation. In addition to external objects, the audio sensor module can monitor the platform vehicle integrity, which can involve detecting sounds indicative of loose parts or vibrations. Weather monitoring by analysing the road noise and raindrop patterns can help the vehicle understand the surface condition it's navigating through. On our trucking application, integration of the microphone array close to the trailing load can help detect loose cargo in the container or trailer.

In some examples, vehicle sensor modules can have a structure that is configured to couple to a semi-truck or another large vehicle. For instance, the sensor module can be shaped similar to a surfboard or another elongated structure that can span across the roof of the semi-truck when installed. The shape and length of the sensor module can aid in aerodynamic operation of the truck when navigating in a forward direction. The sensor module could be coupled to the truck by way of at least one coupling component connected to either side of the roof of the cab of a truck. The set of microphones, in this embodiment, could be embedded within a curved structural cover piece, also mounted on the coupling component. The shape and the curve of the cover pieces can reduce the impact of winds during forward navigation of the vehicle.

Example systems within the scope of the present disclosure will now be described in greater detail. An example system may be implemented in or may take the form of an automobile, but other example systems can be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well.

Referring now to the figures, FIG. 1 is a functional block diagram illustrating vehicle 100, which represents a vehicle capable of operating fully or partially in an autonomous mode. More specifically, vehicle 100 may operate in an autonomous mode without human interaction (or reduced human interaction) through receiving control instructions from a computing system (e.g., a vehicle control system). As part of operating in the autonomous mode, vehicle 100 may use sensors (e.g., sensor system 104) to detect and possibly identify objects of the surrounding environment to enable safe navigation. In some implementations, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or secure wireless connections). In other examples, vehicle 100 may include more or fewer subsystems. In addition, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., 02 monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in enabling navigation by vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure from Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may securely and wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors. In addition, vehicle 100 may also include telematics control unit (TCU) 160. TCU 160 may enable vehicle connectivity and internal passenger device connectivity through one or more wireless technologies.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, an emergency vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radars, LIDARs, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted on top the roof of vehicle 100. Additionally, other mounting locations are possible within examples. In some situations, sensors coupled at these locations can provide data that can be used by a remote operator to provide assistance to vehicle 100.

Figure 3:
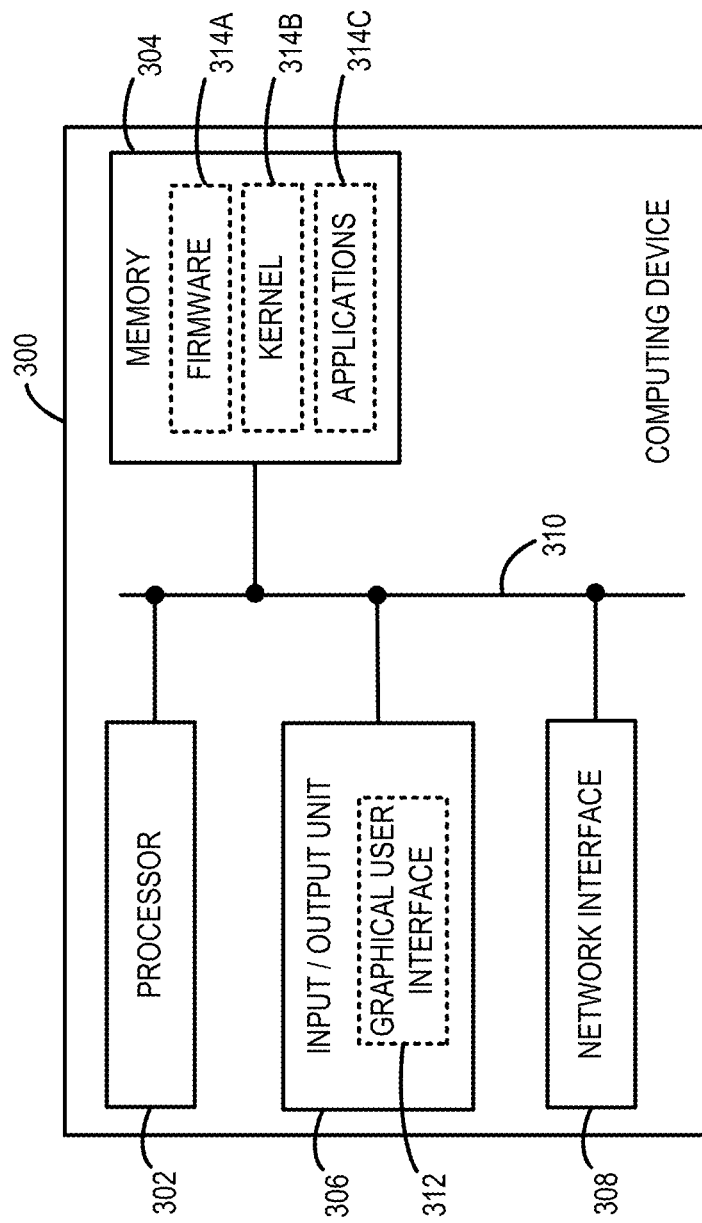
FIG. 3 is a simplified block diagram for a computing system, according to one or more example embodiments.

FIG. 3 is a simplified block diagram exemplifying computing device 300, illustrating some of the components that could be included in a computing device arranged to operate in accordance with the embodiments herein. Computing device 300 could be a client device (e.g., a device actively operated by a user (e.g., a remote operator)), a server device (e.g., a device that provides computational services to client devices), or some other type of computational platform. In some embodiments, computing device 300 may be implemented as computer system 112, which can be located on vehicle 100 and perform processing operations related to vehicle operations. For example, computing device 300 can be used to process sensor data received from sensor system 104. Alternatively, computing device 300 can be located remotely from vehicle 100 and communicate via secure wireless communication. For example, computing device 300 may operate as a remotely positioned device that a remote human operator can use to communicate with one or more vehicles.

In the example embodiment shown in FIG. 3, computing device 300 includes processing system 302, memory 304, input/output unit 306 and network interface 308, all of which may be coupled by a system bus 310 or a similar mechanism. In some embodiments, computing device 300 may include other components and/or peripheral devices (e.g., detachable storage, sensors, and so on).

Processing system 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processing system 302 may be one or more single-core processors. In other cases, processing system 302 may be one or more multi-core processors with multiple independent processing units. Processing system 302 may also include register memory for temporarily storing instructions being executed and related data, as well as cache memory for temporarily storing recently-used instructions and data.

Memory 304 may be any form of computer-usable memory, including but not limited to random access memory (RAM), read-only memory (ROM), and non-volatile memory. This may include flash memory, hard disk drives, solid state drives, rewritable compact discs (CDs), rewritable digital video discs (DVDs), and/or tape storage, as just a few examples.

Computing device 300 may include fixed memory as well as one or more removable memory units, the latter including but not limited to various types of secure digital (SD) cards. Thus, memory 304 can represent both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processing system 302 to carry out any of the methods, processes, or operations disclosed in this specification or the accompanying drawings.

As shown in FIG. 3, memory 304 may include firmware 314A, kernel 314B, and/or applications 314C. Firmware 314A may be program code used to boot or otherwise initiate some or all of computing device 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses), of computing device 300. Applications 314C may be one or more userspace software programs, such as web browsers or email clients, as well as any software libraries used by these programs. In some examples, applications 314C may include one or more neural network applications and other deep learning-based applications. Memory 304 may also store data used by these and other programs and applications.

Input/output unit 306 may facilitate user and peripheral device interaction with computing device 300 and/or other computing systems. Input/output unit 306 may include one or more types of input devices, such as a keyboard, a mouse, one or more touch screens, sensors, biometric sensors, and so on. Similarly, input/output unit 306 may include one or more types of output devices, such as a screen, monitor, printer, speakers, and/or one or more light emitting diodes (LEDs). Additionally or alternatively, computing device 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

As shown in FIG. 3, input/output unit 306 includes GUI 312, which can be configured to provide information to a remote operator or another user. GUI 312 may involve one or more display interfaces, or another type of mechanism for conveying information and receiving inputs. In some examples, the representation of GUI 312 may differ depending on a vehicle situation. For example, computing device 300 may provide GUI 312 in a particular format, such as a format with a single selectable option for a remote operator to select from.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 308. Furthermore, network interface 308 may comprise multiple physical interfaces. For instance, some embodiments of computing device 300 may include Ethernet, BLUETOOTH®, and Wifi interfaces. In some embodiments, network interface 308 may enable computing device 300 to connect with one or more vehicles to allow for remote assistance techniques presented herein.

In some embodiments, one or more instances of computing device 300 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing device 300 may enable the performance of embodiments described herein, including efficient assignment and processing of sensor data.

Figure 4:
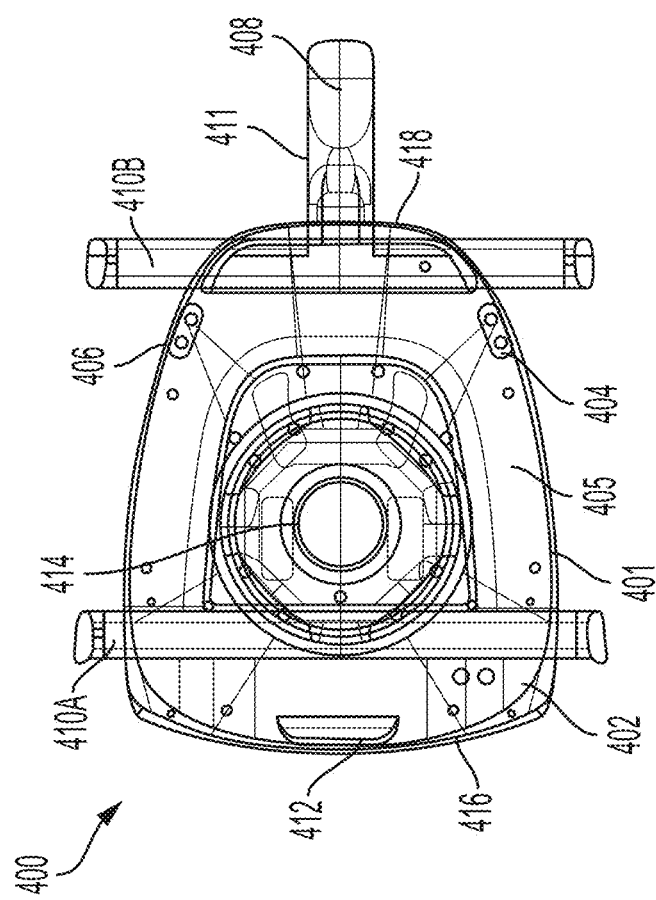
FIG. 4 illustrates a vehicle sensor module with external audio receivers, according to one or more example embodiments.

FIG. 4 illustrates vehicle sensor module 400 with external audio receivers 402, 404, 406, and 408, according to one or more example embodiments. In the example embodiment, vehicle sensor module 400 is shown from a bottom perspective to illustrate example locations for audio receivers 402-408. As shown in FIG. 4, vehicle sensor module 400 includes housing 401, audio receivers 402-408, coupling component 410A, coupling component 410B, extension 411, sensor 412, and sensor 414, among other components. In other examples, vehicle sensor module 400 can have other configurations with different arrangements for components, such as audio receivers 402-408 and sensors 412-414. In addition, vehicle sensor module 400 and other components can differ in size, shape, and material, etc. within examples. The front side 416 of vehicle sensor module 400 is configured to be positioned closest to the front of a vehicle and the back side 418 of vehicle sensor module 400 is configured to be positioned closest to the rear of a vehicle.

Vehicle sensor module 400 is configured to mount on the roof of a vehicle via coupling component 410A and coupling component 410B. When the sensor module is coupled to the vehicle, a front side 416 of sensor module 400 aligns with a front of the vehicle while rear side 418 of sensor module 400 aligns with a rear of the vehicle. When oriented in this direction, audio receiver 404 may be positioned relative to the right hand side of the vehicle and audio receiver 406 may be positioned relative to the left hand side of the vehicle. In other examples, vehicle sensor module 400 can be configured to mount to other locations of a vehicle, such as on a side of the vehicle, near the front of the vehicle or near the back of the vehicle. In some examples, vehicle sensor module 400 may be configured to be coupled to the roof of a vehicle, such that a gap is formed between portions of bottom surface 405 of vehicle sensor module 400 and the vehicle's roof via coupling component 410A and coupling component 410B. For instance, coupling components 410A and 410B can be configured to stretch from the first side of the vehicle to the second side of the vehicle when mounting vehicle sensor module 400 to the roof of the vehicle. As an example result, a gap can be formed between portions of bottom surface 405 of vehicle sensor module 400 and the vehicle's roof, which can allow cool air to flow and cool off sensors 412-414. For instance, air flow from navigation can enter into the space between bottom surface 405 of vehicle sensor module 400 and the vehicle's roof from a front direction and from the sides. In some examples, coupling component 410B can be further positioned to allow warm air heated by sensor operations to flow out towards the rear of the vehicle. This airflow configuration can increase reception of external audio by audio receivers 402-408 while simultaneously enabling warm air to be removed from the sensor module to keep sensors operating in cooler conditions and prevent overheating.

Other coupling configurations are also possible. For instance, in another example embodiment, vehicle sensor module 400 may be coupled to a vehicle using a different quantity of coupling components, which may have a different structure in some implementations. For example, coupling components do not need to be long rectangular strips, as pictured in FIG. 4, but could instead be shaped similar to a rounded bar, a solid platform, or other possible mountable shapes.

Audio receivers 402, 404, 406, 408 represent one or more devices that can convert external sounds from the vehicle's environment into electrical signals for vehicle systems to analyze. In some examples, one or more audio receivers 402-408 may include one or multiple microphones. For instance, audio receiver 402 could be a single microphone in one embodiment. However, in another embodiment, external audio receiver 402 could include a set of two or more microphones contained in a single module.

Audio receiver 402 is shown positioned in front of the first coupling component 410A and extending into a cavity located in the bottom surface of vehicle sensor module 400 proximate the gap between vehicle sensor module 400 and the roof of the vehicle. In addition, audio receivers 404 and 406 are shown positioned in front of the second coupling component 410B, angled into the respective lower sides of vehicle sensor module 400 near the gap between vehicle sensor module 400 and the roof of the vehicle. Further, external audio receiver 404 is configured to detect audio originating from an environment located extending from the right-hand side of the vehicle and external audio receiver 406 is configured to detect audio originating from an environment located extending from the left-hand side of the vehicle. Coupling component 410B further includes extension 411 that extends proximate a rear of vehicle sensor module 400 and toward the rear of the vehicle, where external audio receiver 408 is positioned. At this location and orientation on extension 411, audio receiver 408 can be configured to detect audio originating from behind the vehicle.

Vehicle sensor module 400 is further shown with sensors 412-414, which can represent one or more types of sensors configured to capture information from the surrounding environment or perform other operations (e.g., communication links, obtain overall positioning information). For example, sensor 412 and/or sensor 414 may comprise any combination of one or more cameras, radars, lidars, range finders, radio devices (e.g., Bluetooth and/or 802.11), and acoustic sensors, among other possible types of sensors. Sensors 412-414 could also require other components to be attached to vehicle sensor module 400, such as cooling fans, processing units, or the like. As such, audio receivers 402-408 may be positioned at least a threshold distance away from cooling fans and other equipment that cause noise during external sound reception.

Figure 5:
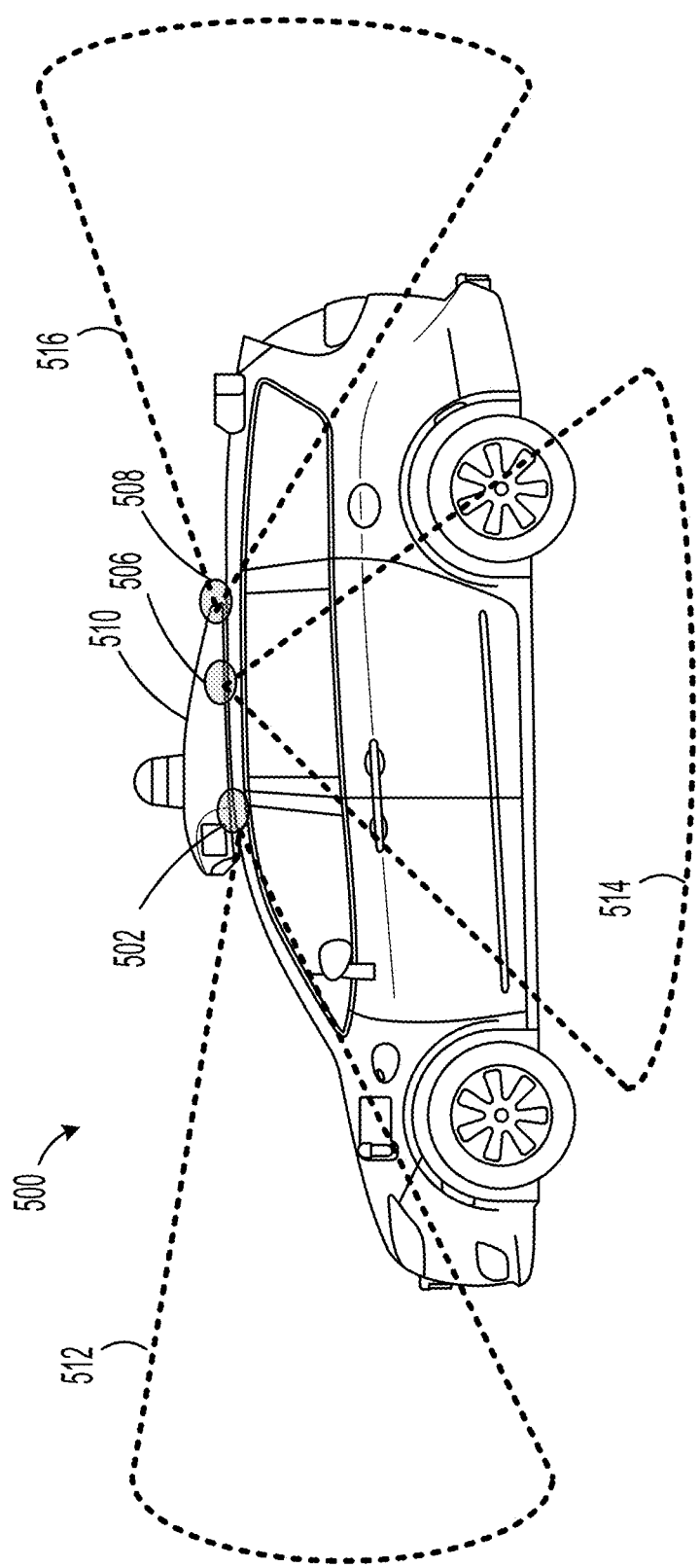
FIG. 5 illustrates a vehicle equipped with a vehicle sensor module, according to one or more example embodiments.

FIG. 5 illustrates a vehicle 500 equipped with external audio receiver locations 502, 504 (not pictured), 506, and 508 on vehicle sensor module 510, according to one or more example embodiments, depicted from a left-hand side of the vehicle.

External audio receivers are configured to be recessed into vehicle sensor module 510 at the locations 502 toward the front of vehicle sensor module 510, 504 (not pictured) on a back, right-hand side of vehicle sensor module 510, 506 on a back, left-hand side of vehicle sensor module 510, and 508 on a rear-facing end of vehicle sensor module 510.

Location 502 for an external audio receiver is recessed upward into the bottom surface of vehicle sensor module 510 proximate the gap between vehicle sensor module 510 and the roof of vehicle 500. The external audio receiver at the location 502 can be one or more microphones configured to gather sound data originating around, at, or near the front of vehicle 500, as illustrated by region 512.

Location 504 (not pictured) for an external audio receiver is angled into the lower, right-hand side of vehicle sensor module 510 proximate the gap between vehicle sensor module 510 and the roof of vehicle 500. Further, the external audio receiver at location 504 is configured to detect audio originating from an environment located relative to the right-hand side of vehicle 500. Further, the external audio receiver at location 504 can be one or more microphones configured to gather sound data originating around, at, or near the right-hand side of vehicle 500.

Location 506 for an external audio receiver is angled into the lower, left-hand side of vehicle sensor module 510 proximate the gap between vehicle sensor module 510 and the roof of vehicle 500. Further, the external audio receiver at location 506 is configured to detect audio originating from a portion of the environment nearby the left-hand side of vehicle 500. Further still, the external audio receiver at location 506 can be one or more microphones configured to gather sound data originating around, at, or near the left-hand side of vehicle 500, as illustrated by region 514.

Location 508 for an external audio receiver is extended proximate a rear of vehicle sensor module 510 and toward the rear of vehicle 500, where the external audio receiver at location 508 is configured to detect audio originating from an environment extending behind the vehicle. Further, the external audio receiver at location 508 can be one or more microphones configured to gather sound data originating around, at, or near the rear of vehicle 500, as illustrated by region 516.

Although it is possible that all external audio receivers could receive audio originating from each particular direction, it is likely that the external audio receiver positioned towards the originating direction of the noise would receive the strongest noise data due to its orientation.

Vehicle sensor module 510 is shown from a left-hand side perspective, with a front of a vehicle being closest to the leftmost portion of the figure and a rear of a vehicle being closest to the rightmost portion of the figure. Vehicle sensor module 510 is configured to be coupled to the roof of vehicle 500, such that a gap is formed between portions of the bottom surface of vehicle sensor module 510 and the roof of the vehicle.

In addition, vehicle sensor module 510 may further include sensors, which could be one or more types of sensor configured to capture information from the surrounding environment or perform other operations (e.g., communication links, obtain overall positioning information). For example, the sensors may comprise any combination of one or more cameras, radars, lidars, range finders, radio devices (e.g., Bluetooth and/or 802.11), and acoustic sensors, among other possible types of sensors. The sensors could also require other components to be attached to vehicle sensor module 510, such as cooling fans, processing units, or the like.

Figure 6:
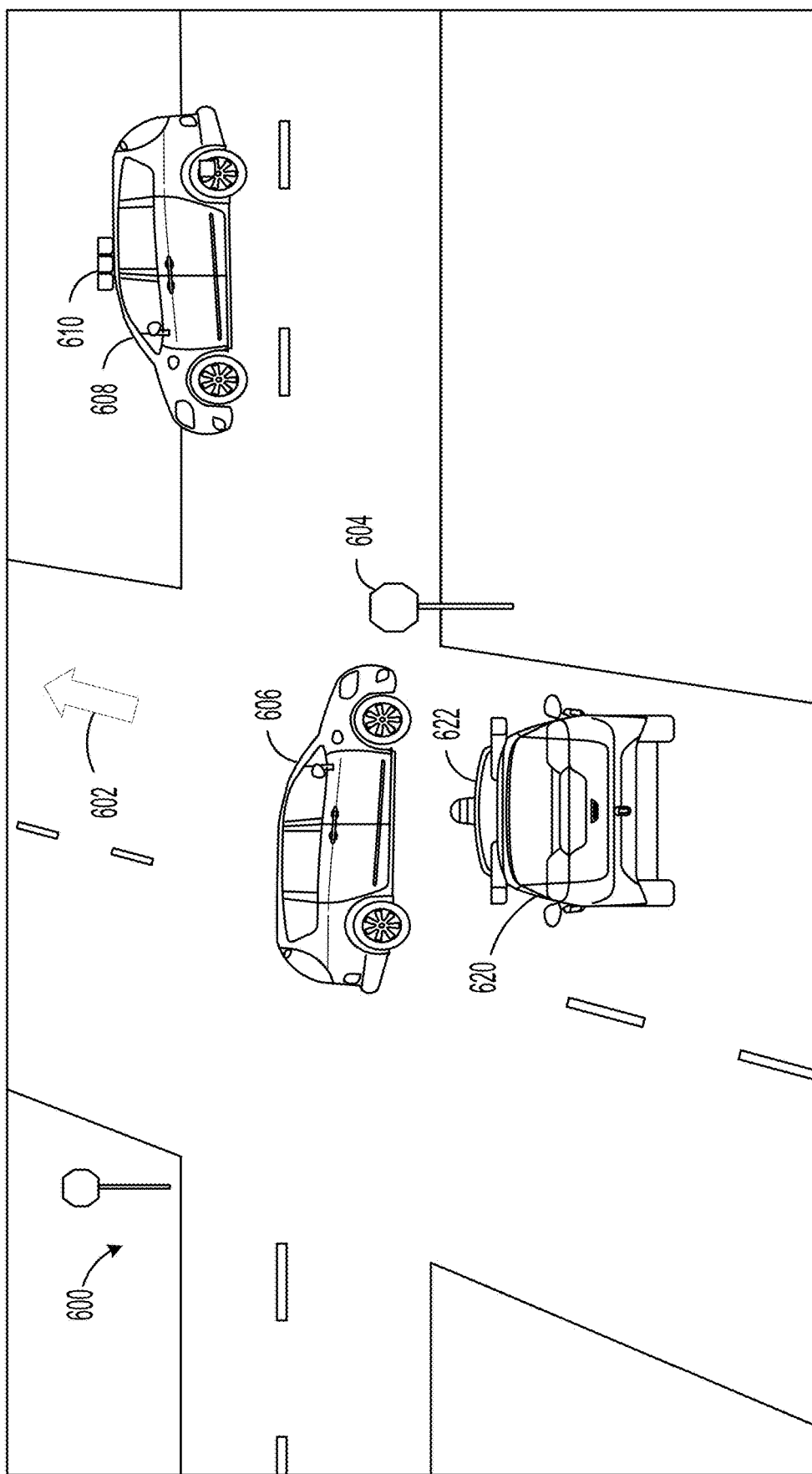
FIG. 6 illustrates a scenario involving a vehicle using external audio receivers to localize an emergency vehicle, according to one or more example embodiments.

FIG. 6 illustrates scenario 600 involving a vehicle 620 using external audio receivers, according to one or more example embodiments. Scenario 600 depicts an intersection in which vehicle 620 is currently navigating on road 602 running vertically from a bottom of the figure to a top of the figure after complying with traffic rules, including stopping at stop sign 604. Vehicle 606 and emergency vehicle 608 equipped with siren 610 are also depicted, both operating in directions roughly perpendicular to the direction of vehicle 620 on a section of the intersection running from a left side of the figure to a right side of the figure.

Vehicle 620 may include vehicle sensor module 622, which may be equipped with external audio receivers as well as other sensors. For instance, vehicle sensor module 622 may be similar to sensor module 400 shown in FIG. 4 or sensor module 500 shown in FIG. 5. The set of external audio receivers within vehicle sensor module 612 atop vehicle 620 are configured to collect sound data generated by the environment at the intersection depicted in scenario 600. This sound data is then processed and analyzed to inform vehicle 620 about its surroundings, and help direct vehicle 620 to safely navigate its environment.

As shown in scenario 600, vehicle 620 may use audio information received from one or more audio receivers positioned on sensor module 622 when determining and performing a control strategy. In some instances, one or multiple audio receivers may capture audio information for a particular sound, such as siren 610 on emergency vehicle 608. A computing device may process the audio information received from one or multiple audio receivers to localize emergency vehicle 608 relative to vehicle 602 based on sound levels measured for siren 610.

In some examples, external audio receivers recessed in the front portion and right-hand side portion of vehicle sensor module 622 may first capture sound emitted by siren 610 as emergency vehicle 608 approaches vehicle 602 from the right-hand side. This initial detection may cause vehicle 620 to remain in a stopped position at stop sign 604 until the siren is no longer blaring or to pull over to a side of the road until the siren is no longer detected. Vehicle 620 may perform other actions based on detection siren 610. After stopping or pulling over, vehicle 620 could remain stopped for a period of time until the external audio receivers in vehicle sensor module 612 indicate that it is safe to proceed. This period of time could be indicative of each external audio sensor of vehicle sensor module 612, working in tandem with one another, locating siren 610 on emergency vehicle 608 as it approaches vehicle 620 from the right-hand side until it is a safe distance passed vehicle 620 on the left-hand side.

In some examples, as siren 610 on emergency vehicle 608 is detected while vehicle 608 is in operation from the right-hand side of vehicle 620 to the left-hand side of vehicle 620, the sound data picked up by the external audio receivers in vehicle sensor module 612 may dynamically change accordingly. Particularly, because emergency vehicle 608 is approaching from the right-hand side in front of vehicle 620, the right-hand side external audio receiver may initially have the strongest detection of the siren. As emergency vehicle 608 begins to pass vehicle 620, the strength of the signal detected by the right-hand side external audio receiver may begin to fade. However, the front external audio receiver may have the strongest detection of the siren at this time, and the left-hand side external audio receiver may begin picking up the sound.

As emergency vehicle 608 passes in front of vehicle 620, the strength of the signal detected by the front external audio receiver will begin to fade, and the left-side external audio receiver may have the strongest detection of the siren. After the emergency vehicle 608 has fully passed vehicle 620, the strength of the signal picked up by the left-hand side external audio receiver may also fade, indicating that it is safe for vehicle 620 to resume operation and navigation in a forward direction.

While this depiction illustrates the occurrence of an emergency vehicle passing by from right to left at an intersection, other situations are also possible for external audio receivers to detect. For example, some situations may include an emergency vehicle approaching from behind and passing in front of vehicle 620, vehicle 620 merging onto a highway, or multiple emergency vehicles operating in the environment of vehicle 620. As shown, vehicle 620 may perform autonomous or semi-autonomous operations based on audio information representing the surrounding environment. In other examples, a driver may control vehicle 620 and use audio information provided by receivers on sensor module 622 to perform operations.

Figure 7A:
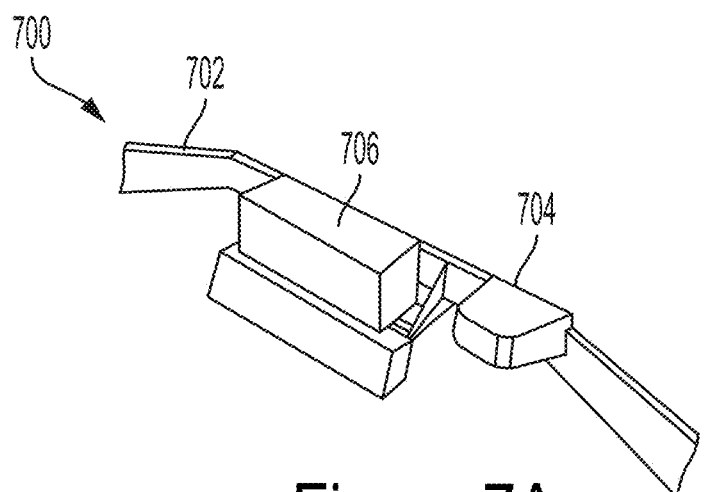
FIG. 7A illustrates another vehicle sensor module with external audio receivers, according to one or more example embodiments.

FIG. 7A illustrates a vehicle sensor module 700 with external audio receivers, according to one or more example embodiments. The configuration as shown in FIG. 7A of the vehicle sensor module 700 may be coupled to a truck via mounting bar 702. Mounting bar 702 is configured to attach to a top, front portion of the cab of a truck, but other configurations and other placements are possible. Mounting bar 702 is depicted as an elongated bar so as to aid in aerodynamic operation of the truck when navigating in a forward direction.

Coupled to mounting bar 702 is external audio receiver cover 704, which is shaped as an end section of a surfboard in this embodiment. External audio receiver cover 704 is designed to contain one or more external audio receivers. Each external audio receiver could comprise one or more microphones, used to collect noise data gathered around the truck in operation. External audio receiver cover 704 is designed to reduce wind exposure of the external audio receivers within, while simultaneously not muffling all sound from reaching external audio receivers. Other configurations of external audio receiver covers are possible as well. Also coupled to mounting bar 702 is sensor 706. Sensor 706 may comprise any combination of one or more cameras, radars, lidars, range finders, radio devices (e.g., Bluetooth and/or 802.11), and acoustic sensors, among other possible types of sensors.

Figure 7B:
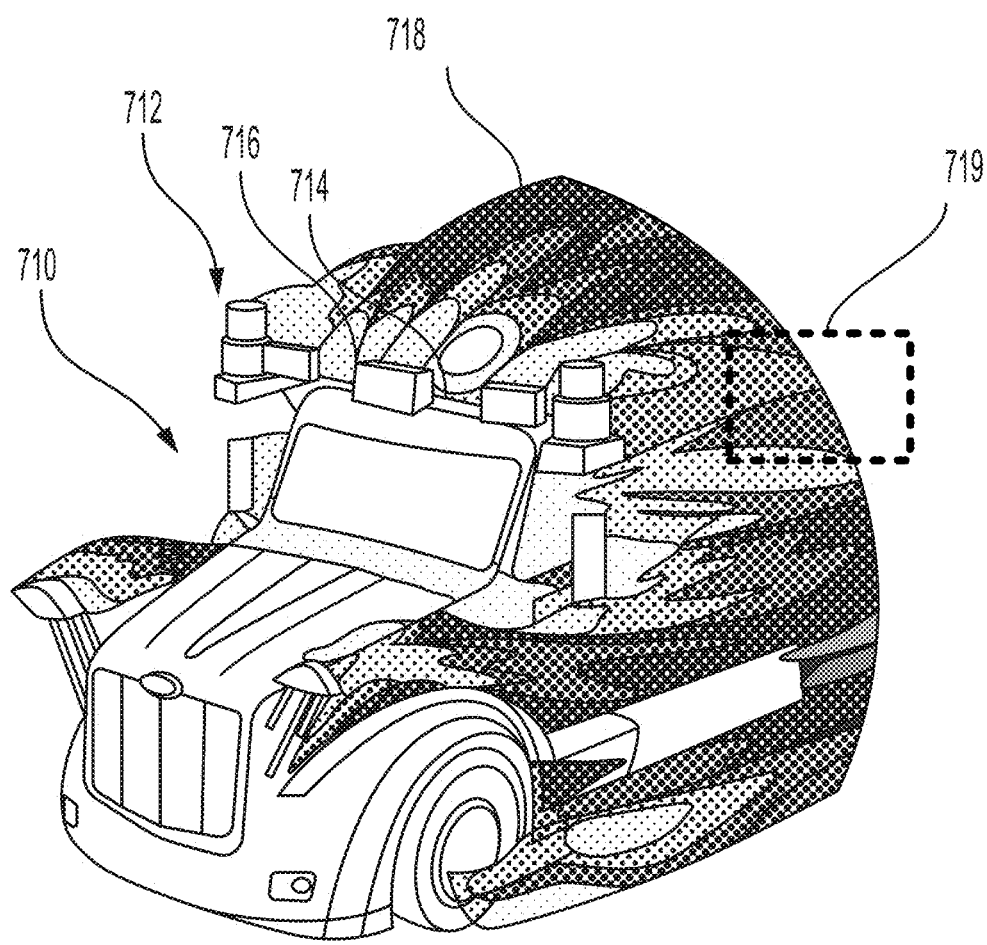
FIG. 7B illustrates a vehicle sensor module with external audio receivers positioned on a truck, according to one or more example embodiments.

FIG. 7B illustrates a cab of a truck 710 with a mounted vehicle sensor module 712, equipped with external audio receivers, according to one or more example embodiments. Vehicle sensor module 712 is mounted to the roof of the cab of the truck 710 via an extended mounting bar 714. An at least one external audio receiver cover (not pictured) is mounted to mounting bar 714 and is configured to contain at least one external audio receiver. The external audio receiver is configured to gather noise data in the environment surrounding the cab of the truck 710 when in operation. Also mounted to the mounting bar is sensor 716. Sensor 716 may comprise any combination of one or more cameras, radars, lidars, range finders, radio devices (e.g., Bluetooth and/or 802.11), and acoustic sensors, among other possible types of sensors. Optionally, on the upper portion of both sides of the cab of the truck, additional external audio receivers 718 and 719 can be embedded in order to detect noise originating from respective sides of the truck. For instance, additional external audio receivers 718 may be placed on the upper, right-hand side of the truck and two additional external audio receivers 719 may be placed on the upper, left-hand side of the truck. These additional audio receivers 718 and 719 may be placed on the cab of the truck strategically to simultaneously maximize sound detection while minimizing interference sounds, such as wind noise and unwanted vibrations from components of the truck, like the tires.

FIG. 7B also depicts the results of a wind simulation test run on the cab of the truck 710. These results of the wind test simulation identify portions of the cab of the truck 710 where wind stagnation is greatest, thereby determining optimal positions to place external audio receivers to minimize the negative effect of wind noise in collected sound data, as indicated by the dark blue regions.

Figure 7C:
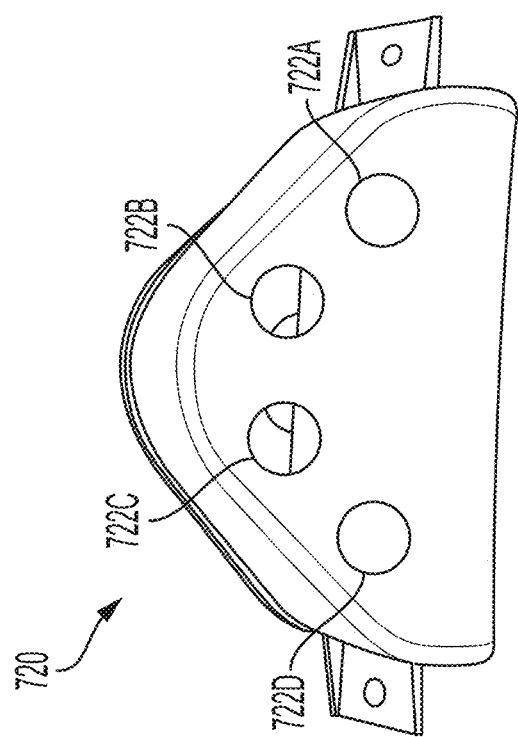
FIG. 7C illustrates an external audio receiver cover, according to one or more example embodiments.

FIG. 7C illustrates external audio receiver cover 720, according to one or more example embodiments. In the example embodiment, external audio receiver cover 720 is shown with four apertures 722A, 722B, 722C, and 722D. One or more apertures may contain one or more audio receiver that measure sounds from the surrounding environment. Although cover 720 is shown with four apertures 722A-722D, other examples can include a different quantity of apertures.

Cover 720 may be configured to reduce direct wind contact on an external audio receiver contained within. In some instances, cover 720 may also prevent water and other debris from reaching audio receivers and/or other components protected by cover 720. As such, cover 720 could be made of various materials that provide protection to internal components. In some examples, cover 720 can prevents water from entering, thereby improving the performance of audio receivers during operation of the vehicle. In some instances, sound may be detected by internal audio receivers via four apertures 722A, 722B, 722C, and 722D.

Figure 8:
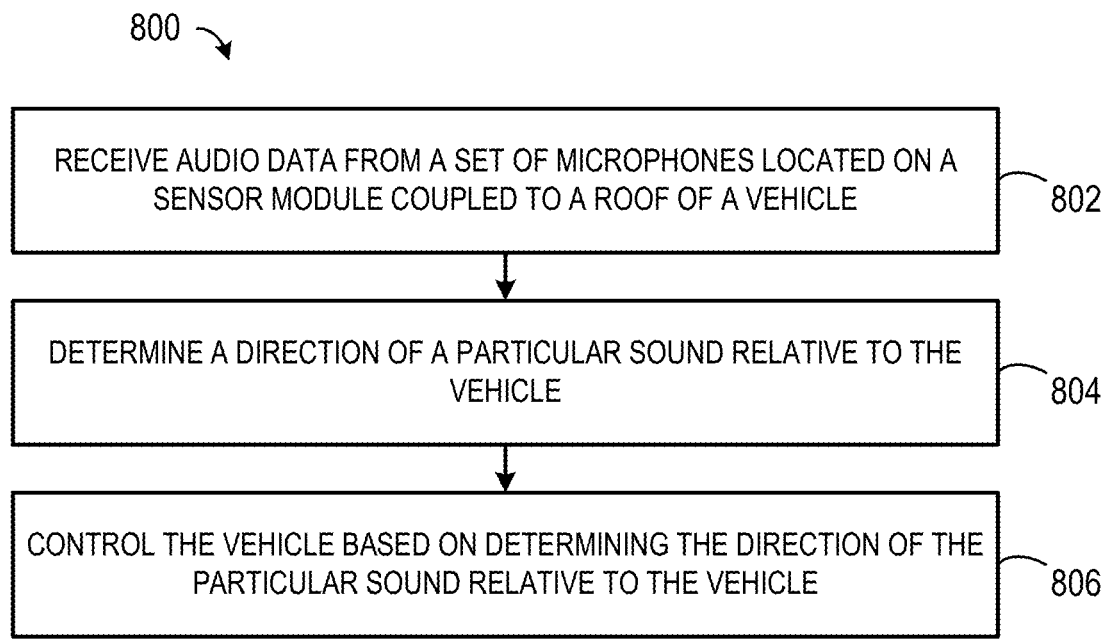
FIG. 8 is a flow chart of a method, according to one or more example embodiments.

FIG. 8 is a flow chart of a method for vehicle occupancy confirmation, according to example implementations. Method 800 represents an example method that may include one or more operations, functions, or actions, as depicted by one or more of blocks 802, 804, and 806, each of which may be carried out by any of the systems, devices, and/or vehicles shown in FIGS. 1-6B, among other possible systems. For instance, system 400 depicted in FIG. 4 may enable execution of method 800.

Those skilled in the art will understand that the flowchart described herein illustrates functionality and operations of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

At block 802, method 800 involves receiving audio data from a set of microphones located on a sensor module coupled to a roof of a vehicle. The audio data can represent one or more sounds originating from an environment of the vehicle. The set of microphones may include a first microphone positioned proximate to the front of the sensor module. In some implementations, the first microphone can extend into a given portion of the bottom surface of the sensor module proximate a gap that is formed by the coupling of the sensor module to the vehicle's roof. The microphones may also include a second microphone extending into a first side of the sensor module such that the second microphone is configured to detect audio originating from the environment located extending from a first side of the vehicle, and a third microphone extending into a second side of the sensor module such that the third microphone is configured to detect audio originating from the environment located extending from a second side of the vehicle. The second side may be opposite of the first side. In addition, the sensor module can include other microphones, such as a fourth microphone oriented to detect audio from behind the vehicle.

At block 804, method 800 involves determining a direction of a particular sound relative to the vehicle based on the audio data. For instance, the computing device may determine the direction of an emergency vehicle relative to the vehicle.

In some examples, the computing device may perform a comparison between audio data received from each microphone and determine the direction of the particular sound relative to the vehicle based on the comparison.

At block 806, method 800 involves controlling the vehicle based on determining the direction of the particular sound relative to the vehicle. For instance, the computing device may cause the vehicle to pull-over to the side of a road to provide a path for an emergency vehicle to use to pass.

Figure 9:
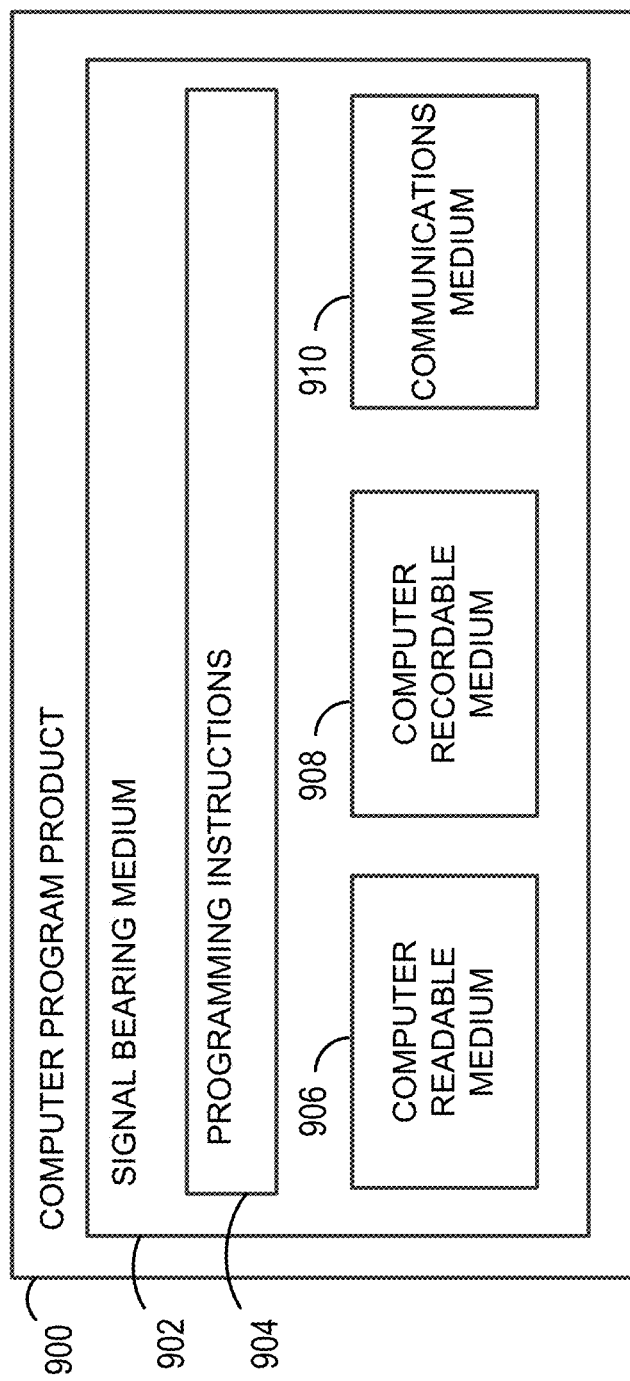
FIG. 9 is a schematic diagram of a computer program, according to one or more example embodiments.

FIG. 9 is a schematic diagram of a computer program, according to an example implementation. In some implementations, the disclosed methods may be implemented as computer program instructions encoded on a non-transitory computer-readable storage media in a machine-readable format, or on other non-transitory media or articles of manufacture.

In the embodiment shown in FIG. 9, computer program product 900 is provided using signal bearing medium 902, which may include one or more programming instructions 904 that, when executed by one or more processors may provide functionality or portions of the functionality described above with respect to FIGS. 1-8.

Signal bearing medium 902 may encompass a non-transitory computer-readable medium 906, such as, but not limited to, a hard disk drive, a Compact Disc (CD), a Digital Video Disk (DVD), a digital tape, memory, components to store remotely (e.g., on the cloud) etc. In some implementations, signal bearing medium 902 may encompass computer recordable medium 908, such as, but not limited to, memory, read/write (R/W) CDs, R/W DVDs, etc.

In some implementations, signal bearing medium 902 may encompass communications medium 910, such as, but not limited to, a digital and/or an analog communication medium (e.g., a fiber optic cable, a waveguide, a wired communications link, a wireless communication link, etc.). Similarly, signal bearing medium 902 may correspond to a remote storage (e.g., a cloud). A computing system may share information with the cloud, including sending or receiving information. For example, the computing system may receive additional information from the cloud to augment information obtained from sensors or another entity. Thus, for example, signal bearing medium 902 may be conveyed by a wireless form of communications medium 910.

One or more programming instructions 904 may be, for example, computer executable and/or logic implemented instructions. In some examples, a computing device such as computer system 112 shown in FIG. 1 or computing device 300 shown in FIG. 3 may be configured to provide various operations, functions, or actions in response to programming instructions 904 conveyed to the computer system by one or more of computer readable medium 906, computer recordable medium 908, and/or communications medium 910. The non-transitory computer readable medium could also be distributed among multiple data storage elements and/or cloud (e.g., remotely), which could be remotely located from each other. Computing device that executes some or all of the stored instructions could be a vehicle. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A system comprising:
   a vehicle;
   a sensor module coupled to a roof of the vehicle such that a gap is formed between portions of a bottom surface of the sensor module and the roof, wherein the sensor module includes one or more sensors;
   an elongate extension coupled to the sensor module such that the elongate extension extends out toward a rear of the vehicle; and
   a set of microphones coupled to the sensor module, wherein the set of microphones includes:
   (i) a first microphone positioned proximate a front of the sensor module, wherein the first microphone extends into a given portion of the bottom surface of the sensor module proximate the gap;
   (ii) a second microphone extending into a first side of the sensor module such that the second microphone is configured to detect audio originating from an environment extending from a first side of the vehicle,
   (iii) a third microphone extending into a second side of the sensor module such that the third microphone is configured to detect audio originating from the environment extending from a second side of the vehicle, wherein the second side is opposite of the first side, and
   (iv) a fourth microphone positioned proximate an end of the elongate extension opposite of the sensor module such that the fourth microphone is configured to detect audio originating from the environment extending from the rear of the vehicle.

2. The system of claim 1, further comprising:
a first coupling component and a second coupling component,
wherein each coupling component is arranged at an orientation that aligns with a direction extending from the first side of the vehicle to the second side of the vehicle, and
wherein the first coupling component and the second coupling component are configured to couple to the sensor module to the roof of the vehicle.

3. The system of claim 2, wherein the first microphone is positioned proximate the first coupling component, and
wherein the second microphone and the third microphone are proximate the second coupling component.

4. The system of claim 1, wherein the vehicle is a semi-truck,
wherein the sensor module has an elongate structure, and
wherein each microphone includes a curved cover.

5. The system of claim 1, wherein the one or more sensors comprises:
a lidar unit coupled to a top surface of the sensor module.

6. The system of claim 1, wherein the one or more sensors comprises:
at least one camera coupled proximate the front of the sensor module.

7. The system of claim 1, further comprising:
one or more fans positioned inside the sensor module,
wherein each fan is configured to decrease operation temperature for one or more sensors coupled to the sensor module, and
wherein each microphone is coupled to the sensor module at least a threshold distance from the one or more fans.

8. The system of claim 1, wherein the second microphone and the third microphone are coupled to the sensor module at a downward angle relative to a horizontal plane that extends parallel to a road surface.

9. The system of claim 1, wherein each microphone includes a pair of audio receivers.

10. A sensor module comprising:
one or more sensors;
an elongate extension coupled to the sensor module such that the elongate extension extends out away from a rear of the sensor module; and
a set of microphones comprising:
(i) a first microphone positioned proximate a front of the sensor module, wherein the first microphone extends into a given portion of a bottom surface of the sensor module;
(ii) a second microphone extending into a first side of the sensor module such that the second microphone is configured to detect audio originating from an environment extending from the first side of the sensor module, and
(iii) a third microphone extending into a second side of the sensor module such that the third microphone is configured to detect audio originating from the environment extending from the second side of the sensor module, wherein the second side is opposite of the first side, and
(iv) a fourth microphone positioned proximate an end of the elongate extension opposite of the sensor module such that the fourth microphone is configured to detect audio originating from the environment extending from the rear of the sensor module.

11. The sensor module of claim 10, further comprising:
a first coupling component and a second coupling component configured to couple the sensor module to a roof of a vehicle, wherein each coupling component is arranged at an orientation that aligns with a direction extending from a first side of the vehicle to a second side of the vehicle.

12. The sensor module of claim 11, wherein the first microphone is positioned proximate the first coupling component, and
wherein the second microphone and the third microphone are positioned on the first side of the sensor module and the third side of the sensor module proximate the second coupling component.

13. The sensor module of claim 10, further comprising:
one or more coupling components configured to couple the sensor module to the roof of a vehicle such that a gap is formed between portions of the bottom surface of the sensor module and the roof.

14. The sensor module of claim 10, wherein the one or more sensors includes at least a camera and a lidar.

15. The sensor module of claim 10, further comprising:
one or more fans positioned inside the sensor module,
wherein each fan is configured to decrease operation temperature for one or more sensors coupled to the sensor module, and
wherein each microphone is coupled to the sensor module at least a threshold distance from the one or more fans.

16. A method comprising:
receiving, at a computing device, audio data from a set of microphones located on a sensor module coupled to a roof of a vehicle, wherein the audio data represents one or more sounds originating from an environment of the vehicle, wherein the sensor module includes an elongate extension coupled to the sensor module such that the elongate extension extends out toward a rear of the vehicle, and wherein the set of microphones comprises:
(i) a first microphone positioned proximate a front of the sensor module, wherein the first microphone extends into a given portion of the bottom surface of the sensor module;
(ii) a second microphone extending into a first side of the sensor module such that the second microphone is configured to detect audio originating from the environment extending from a first side of the vehicle, and
(iii) a third microphone extending into a second side of the sensor module such that the third microphone is configured to detect audio originating from the environment extending from a second side of the vehicle, wherein the second side is opposite of the first side
(iv) a fourth microphone positioned proximate an end of the elongate extension opposite of the sensor module such that the fourth microphone is configured to detect audio originating from the environment extending from the rear of the vehicle; and
based on the audio data, determining a direction of a particular sound relative to the vehicle; and
controlling the vehicle based on determining the direction of the particular sound relative to the vehicle.

17. The method of claim 16, wherein determining the direction of the particular sound relative to the vehicle comprises:
determining the direction of an emergency vehicle relative to the vehicle.

18. The method of claim 16, further comprising:
performing a comparison between audio data received from each microphone; and
wherein determining the direction of a particular sound relative to the vehicle comprise:
determining the direction of the particular sound relative to the vehicle based on the comparison.

19. The system of claim 1, wherein the sensor module further comprises:
a processor, wherein the processor is configured to:
receive audio data from the set of microphones;
perform a comparison between the audio data received from each microphone; and
determine a direction of a particular sound relative to the vehicle based on the comparison.

20. The sensor module of claim 10, further comprising:
a processor, wherein the processor is configured to:
receive audio data from the set of microphones;
perform a comparison between the audio data received from each microphone; and
determine a direction of a particular sound relative to the sensor module based on the comparison.

\* \* \* \* \*